United States Patent [19]

Behymer

[11] Patent Number: 4,819,309
[45] Date of Patent: Apr. 11, 1989

[54] FASTENER WITH PARTS HAVING PROJECTING ENGAGING PORTIONS

[75] Inventor: D. James Behymer, White Bear Lake, Minn.

[73] Assignee: Minnesota Mining and Manufacturing Company, Saint Paul, Minn.

[21] Appl. No.: 90,212

[22] Filed: Aug. 27, 1987

[51] Int. Cl.$^4$ .............................................. A44B 11/25
[52] U.S. Cl. ........................................ 24/576; 24/587
[58] Field of Search .................. 24/575, 576, 577, 587, 24/703; 383/86, 87, 93, 95

[56] References Cited

U.S. PATENT DOCUMENTS

| | | |
|---|---|---|
| 2,315,414 | 3/1943 | Germany . |
| 2,914,936 | 12/1959 | Reinold . |
| 3,098,276 | 7/1963 | Rechsteiner . |
| 3,853,671 | 12/1974 | Ausait .................. 24/587 X |
| 4,123,826 | 11/1978 | Tunaka .................... 24/577 |
| 4,128,918 | 12/1978 | Weak . |
| 4,581,269 | 4/1986 | Tilman ................. 24/587 X |
| 4,581,792 | 4/1986 | Spier ........................ 24/575 |
| 4,618,383 | 10/1986 | Herrington ............. 24/576 X |
| 4,647,715 | 3/1987 | Butler . |
| 4,691,373 | 9/1987 | Ausnit ................... 24/576 X |

FOREIGN PATENT DOCUMENTS

| | | | |
|---|---|---|---|
| 706084 | 3/1965 | Canada ............................ 24/576 |
| 371073 | 9/1963 | Switzerland .................... 24/576 |
| 659970 | 10/1951 | United Kingdom ............. 24/576 |
| 943668 | 12/1963 | United Kingdom ............. 24/576 |

Primary Examiner—Kenneth J. Dorner
Assistant Examiner—James R. Brittain
Attorney, Agent, or Firm—Donald M. Sell; Walter N. Kim; William L. Huebsch

[57] ABSTRACT

A fastener comprising two similar releasably engagable parts that may be cut from the same extrusion. Each part has a base portion that may be secured to other objects, and major and minor portions projecting in spaced relationship from the base portion. The major projecting portion has a ridge along its distal end, a recess along its side opposite the minor projecting portion, and a plurality of teeth facing the base portion along its side surface adjacent the minor projecting portion, and the minor projecting portion has a lip along its side adjacent the major projecting portion. The major and minor projecting portions define slots there between adapted so that the slot on each part can simultaneously receive the ridge on the other of the parts with the corrugations of the parts in face to face relationship and the lips on each of the parts in the slot of the other, to which position the parts may be pressed, and at which position the parts will be retained.

14 Claims, 3 Drawing Sheets

FASTENER WITH PARTS HAVING PROJECTING ENGAGING PORTIONS

TECHNICAL FIELD

The present invention relates to fasteners of the type having two separable parts each adapted to be attached to a different object, which fastener parts can then be releasably engaged to attach the objects to each other.

BACKGROUND ART

The art is replete with fasteners of the type having two separable parts each adapted to be attached to a different object, which fastener parts can then be releasably engaged to attach the objects to each other. U.S. Pat. Nos. 3,266,113 and 4,290,174 provide illustrative examples.

Various methods, such as individual molding which is slow or several complex processing steps are used to make such fasteners, which methods may make the fasteners too expensive for use in some applications. Also, many known fasteners do not develop the holding force required for many applications and do not afford easy tailoring of such holding force over a wide range for use in various applications.

DISCLOSURE OF INVENTION

The present invention provides a two part fastener that can be rapidly produced by simple production methods, and which can be adapted to provide a wide range of holding forces including very high holding forces.

According to the present invention there is provided a fastener comprising two similar parts. Each part has a uniform cross section along an axis and includes a base portion including means for securing the fastener part to other objects, and major and minor projecting portions projecting in spaced relationship from the base portion. The major projecting portion has a ridge along its distal end parallel to the axis, a recess along its side opposite the minor projecting portion parallel to the axis and defining the side of the ridge adjacent the base portion, and a plurality of corrugations along its side surface adjacent the minor projecting portion and parallel to the axis. The minor projecting portion has a lip along its side adjacent the major projecting portion and parallel to the axis. The major and minor projecting portions of the parts are shaped and spaced from each other to define slots there between adapted so that the slot on each part can simultaneously receive the ridge on the other of the parts with the corrugations of the parts in face to face relationship and the lips on each of the parts in the slot of the other. The ridges lips and corrugations of the parts have cam surfaces adapted to engage each other to resiliently bend the parts to afford simultaneous entry of the ridges into the slots and the corrugations into face to face relationship to engage the parts when the parts are pressed together in directions at right angles to their axes. Also, the ridges lips and corrugations of the parts have holding surfaces adapted to hold the parts together when they are pulled away from each other in directions at right angles to their axes, which holding surfaces can be shaped to lock the parts together, or alternatively can provide cam surfaces adapted to engage each other to resiliently bend the parts to afford simultaneous movement of the ridges out of the slots and movement of the corrugations over each other to disengage the parts when the parts are pulled away from each other in those directions.

Typically the shapes of the two parts in planes transverse of the axis are identical, and the parts are severed from a longitudinal member having the shape described above that may be simply and rapidly made by the extrusion process.

The cam and holding surfaces on the corrugations of the fastener parts intersect along lines parallel to the axis, with the sizes, shapes and orientations of those cam surfaces being selected to help provide the desired levels of engagement forces, and (where disengagement is possible) the desired levels of disengagement forces for the fastener. Preferably the cam and holding surfaces are planar and define tooth like corrugations with the engagement cam surfaces facing generally away from the base portion, and the holding surfaces facing generally toward the base portions of the parts, and the angles at which those engagement and holding surfaces are disposed with respect to the directions in which the parts are moved into and out of engagement being selected to help provide a desired relationship between engagement and disengagement forces for the fastener parts.

BRIEF DESCRIPTION OF DRAWING

The present invention will be further described with reference to the accompanying drawing wherein like reference numerals refer to like parts in the several views, and wherein.

DETAILED DESCRIPTION

Figure 3:
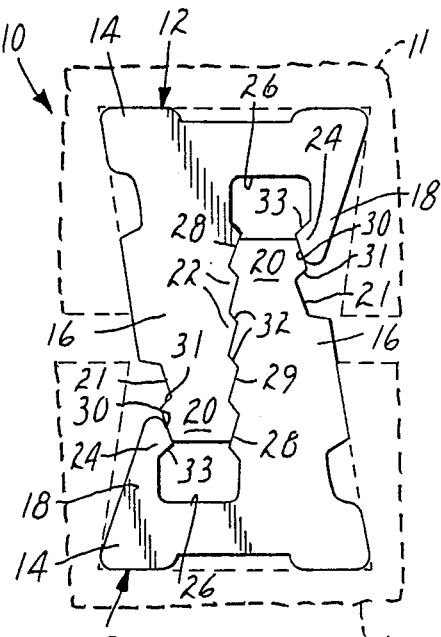
FIG. 3 is an end view of the fastener and objects of FIG. 2 in which the two parts are out of engagement but are adjacent in a position from which they can be engaged by pressing them together.
Figure 2:
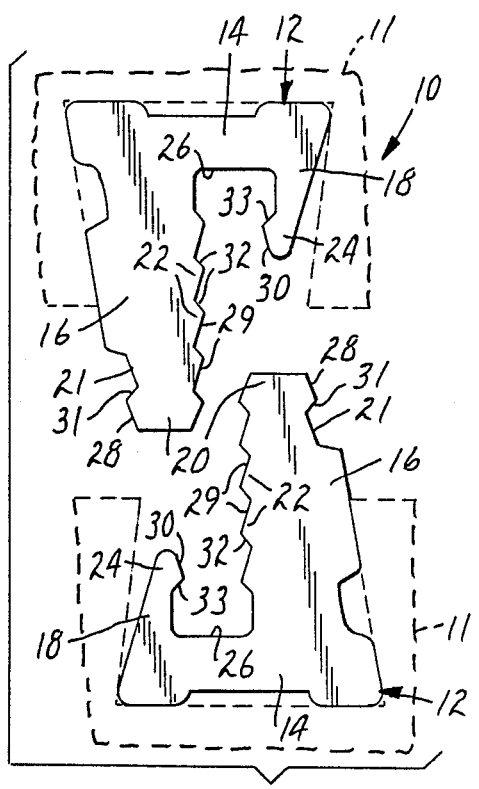
FIG. 2 is an end view of two of the parts illustrated in FIG. 1 that can form a first embodiment of a fastener according to the present invention shown separated and attached to fragments of separate objects illustrated in dotted outline.
Figure 4:
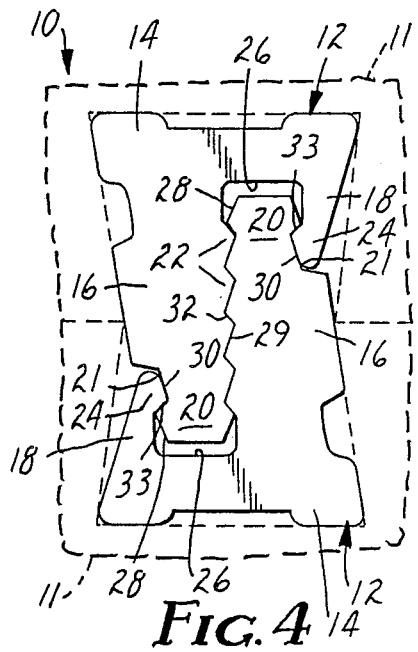
FIG. 4 is an end view of the fastener and objects of FIG. 2 in which the two parts are in engagement.

Referring now to the drawing, there is illustrated in FIGS. 2 through 4 a first embodiment of a fastener 10 according to the present invention comprising two similar or identical parts 12 shown attached to fragments of objects 11 to be joined.

Figure 1:
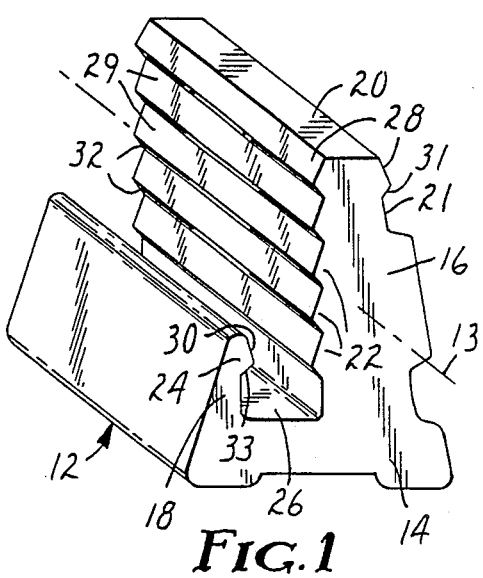
FIG. 1 is an isometric view of one of two similar parts included in fasteners according to the present invention.

An isometric view of one of the parts 12 is shown in FIG. 1. Each part 12 has a uniform cross section along an axis 13 (which axis 13 is indicated by a line in FIG. 1 and as used herein means a generally central line in the part 12 at a right angle to which axis 13 all cross sections of the part 12 have the same shape) and includes a base portion 14 including means for securing the fastener part 12 to other objects (which means for the part 12 illustrated is a dovetail shape for the base portion 14 along the axis 13 so that the base portions 14 are adapted to be received in a mating dovetail shaped grooves in the objects 11), and major and minor projecting portions 16 and 18 projecting in spaced relationship from the base portion 14. The major projecting portion 16 has a ridge 20 along its distal end parallel to the axes 13, a recess 21 along its side opposite the minor projecting portion 18 parallel to the axis 13 and defining the side of the ridge 20 adjacent the base portion 14, and a plurality of corrugations 22 along its side surface adjacent the minor projecting portion 18 and parallel to the axis 13. The minor projecting portion 18 has a lip 24 along its side adjacent the major projecting portion 16 and parallel to the axis 13. The major and minor projecting portions 16 and 18 of the parts 12 are shaped and spaced from each other to define slots 26 there between adapted so that the slot 26 on each part 12 can simultaneously receive the ridge 20 on the other of the parts 12 (FIG. 4) with the corrugations 22 of the parts 12 in face to face relationship and the lip 24 on each of the parts 12 in the recess 21 of the other. The ridges 20 and the major and minor projecting portions 16 and 18 of the parts 12 have engagement cam surfaces 28, 29 and 30 respectively adapted to engage each other to resiliently bend the parts 12 and afford simultaneous entry of the ridges 20 into the slots 26 and the corrugations 22 into face to face relationship to engage the parts 12 as shown in FIG. 4 when the parts 12 are pressed together in directions at right angles to the axis 13 with a first force from the position of the parts 12 shown in FIG. 3, and holding cam surfaces 31, 32 and 33 respectively adapted to hold the parts together when they are in engagement and to engage each other to resiliently bend the parts 12 and afford simultaneous movement of the ridges 20 out of the slots 26 and movement of the corrugations 22 over each other to disengage the parts 12 when the parts 12 are pulled away from each other with a force greater than that first force.

The corrugations 22 are defined by the engagement cam surfaces 29 and the holding cam surfaces 32 that are planar and intersect to define tooth like corrugations 22 with the engagement cam surfaces 29 facing generally away from the base portion 14, and the holding surfaces 32 facing generally toward the base portions 14 of the parts 12. The angles at which those engagement and holding surfaces 29 and 32 are disposed with respect to the directions in which the parts 12 are moved into and out of engagement are selected to help provide a desired relationship between engagement and disengagement forces for the fastener parts 12. As an example, with the parts 12 extruded from plasticized polyvinyl chloride the holding surfaces 32 being about 0.074 centimeter wide and disposed at an angle of about 45 degrees with respect to the directions the parts 12 are engaged and disengaged, and with the engagement surfaces 29 being about 0.163 centimeter wide and disposed at an angle of about 22.5 degrees with respect to the directions in which the parts 12 are engaged and disengaged, engagement forces of 30 pounds and disengagement forces of 70 pounds can be developed for parts 2.54 centimeter (one inch) long along their axes 13. The angle at which the holding surfaces 32 are disposed with respect to the directions in which the parts 12 are moved into and out of engagement can be increased toward 90 degrees to increase the disengagement force for the connector, and such disengagement force can be thus increased until the parts of the connector can not be disengaged without breaking them.

The parts 12 could be made of many materials such as polymeric materials (e.g., Delrin or plasticized polyvinyl chloride) or metals (e.g., aluminum or bronze). The parts 12 can be made by first making an elongate member having the cross sectional shape of the parts 12 along the axis 13 preferably by the extrusion process, although other processes such as machining could also be used. The elongate member is then severed transverse to the axis 13 to form the parts 12 such as by the use of a knife or saw.

The flexibility of the parts 12 which allows the lips 24 to cam around the ridges 20 to afford simultaneous entry of the ridges 20 into the slots 26 and the corrugations 22 into face to face relationship when the parts 12 are pressed together and which affords simultaneous movement of the ridges 20 out of the slots 26 and movement of the corrugations 22 over each other to disengage the parts 12 when the parts 12 are pulled apart can be adjusted by the wall thickness of the parts, and if necessary, can be further modified such as by cutting or forming a slot in the base portion 14 to make it more flexible.

Figure 5:
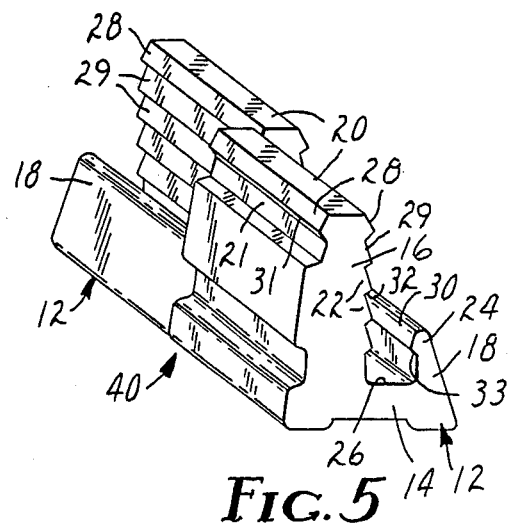
FIG. 5 is an isometric view of two of the parts illustrated in FIG. 1 that are disposed side by side so that together they form half of a second embodiment of a fastener according to the present invention (the other half of which fastener is not shown but is identical to the first half)

FIG. 5 illustrates the use of two of the parts 12 illustrated in FIG. 1 disposed end to end with their axes parallel but with the projections on the two parts on opposite sides of their axes 13 so that together they form a half 40 of a second embodiment of a fastener according to the present invention, the other half of which fastener is not shown but is identical to the half 40 illustrated. The parts 12 when used to form the fastener embodiment, one half 40 of which is illustrated in FIG. 5, provide the advantage that the two halves 40 of the fastener are restricted from sliding axially relative to each other, which sliding can be possible when only a single part 12 is used for each half as in the embodiment illustrated in FIGS. 2 through 4. It is contemplated that members to be connected such as wires or optical fibers could be mounted in the two parts 12 forming each half 40 of the connector or between those parts 12, and that the interface between the parts 12 in each half could locate the four parts 12 of the engaged connector with sufficient accuracy to engage ends of such wires or fibers that are fitted with conventional connecting elements such as pins and sockets.

FIGS. 6 through 11 illustrate various shapes for base portions of connector parts according to the present invention that provide means, in addition to the dovetail shape shown in FIGS. 1 through 5, by which the parts may be attached to objects (some of which objects are also illustrated).

Figure 6:
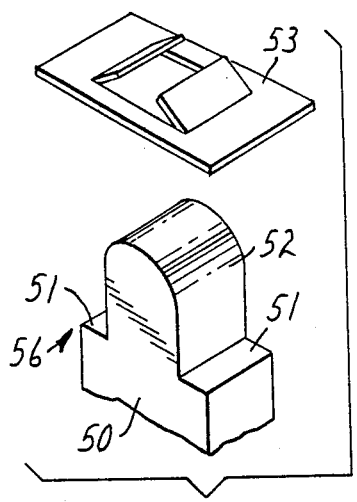

As shown in FIG. 6, a base portion 50 of a connector part 56 (which connector part 56, except for the change in shape of its base portion 50, is the same as the part 12) may have a surface 51 from which projects a rounded projection 52 sized to have a conventional Timmerman nut 53 pressed over the projection 52 after it has been inserted through a close fitting opening in a thin object (not shown) to which the connector part 56 is to be attached.

Figure 7:
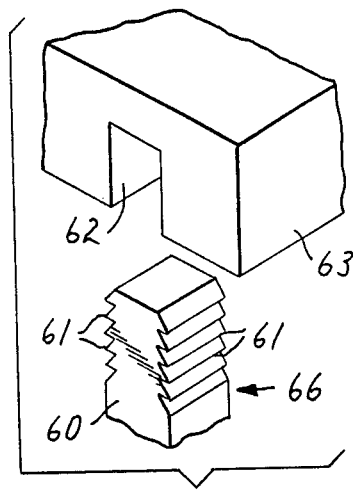

As shown in FIG. 7, a base portion 60 of a connector part 66 (which connector part 66, except for the change in shape of its base portion 60, is the same as the part 12) may have barbs 61 formed along its opposite sides parallel to its axis, which barbed base portion 60 may then be pressed with an interference fit into a groove 62 in an object 63.

Figure 8:
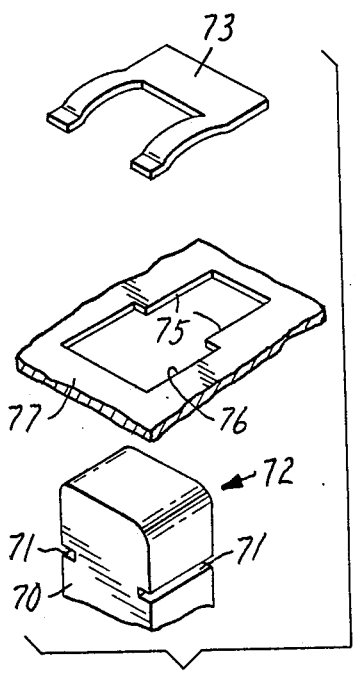

As shown in FIG. 8, a base portion 70 of a connector part 72 (which connector part 72, except for the change in shape of its base portion 70, is the same as the part 12) may have axially extending slots 71 along opposite sides adapted to receive spaced legs of a known type of spring clip 73 after the base portion 70 has been inserted through an opening in an object (not shown), or to receive opposite ledges 75 of a thin object 77 having an access opening 76 affording access to ends of the ledges 75.

Figure 9:
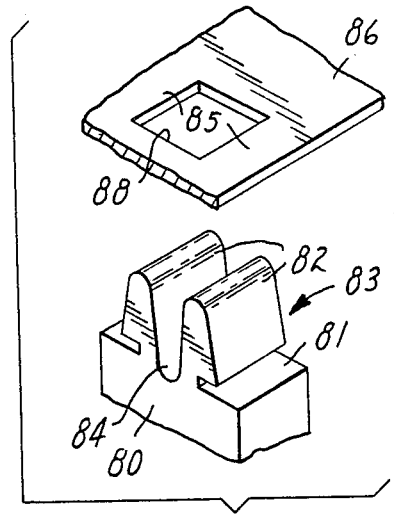

As shown in FIG. 9, a base portion 80 of a connector part 83 (which connector part 83, except for the change in shape of its base portion 80, is the same as the part 12) may have axially extending slots 81 along opposite sides of spaced hook like portions 82 having a groove 84 therebetween that affords resilient deflection of the hook like portions 82 toward each other, which slots 81 are adapted to receive opposite ledges 85 of a thin object 86 after the hook like portions 82 have been resiliently deflected toward each other and inserted through an opening 88 between the ledges 85.

Figure 10:
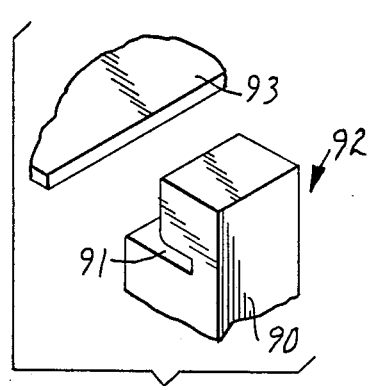
FIGS. 6 through 11 are fragmentary isometric views of alternate embodiments of fastener parts according to the present invention having various means on their base portions for attaching the fastener parts to objects, and fragmentary isometric views of various types of objects to which certain ones of the fastener parts can be attached.

As shown in FIG. 10, a base portion 90 of a connector part 92 (which connector part 92, except for the change in shape of its base portion 90, is the same as the part 12) may have a single axially extending slot 91 opening along one side and be adapted to frictionally receive in the slot 91 an edge portion of a thin object 93.

Figure 11:
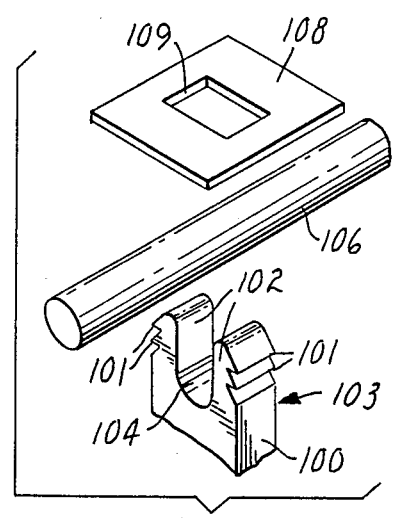

As shown in FIG. 11, a base portion 100 of a connector part 103 (which connector part 103, except for the change in shape of its base portion 100, is the same as the part 12) may have axially extending teeth 101 along opposite sides of spaced projections 102 having a recess 104 there between, which recess 104 can receive a rod like object 106 after which a clip 108 having an opening 109 therein is engaged around the projections 102 as they are resiliently deflected toward each other so that thereafter the clip 108 will be retained on the projections 102 by the teeth 101 and in turn maintain engagement of the base portion 100 with the object 106.

The present invention has now been described with reference to several embodiments thereof. It will be apparent to those skilled in the art that many changes can be made in the embodiments described without departing from the scope of the present invention. For example, connector parts with different means on their base portions for engagement to objects could be engaged to each other to form a connector, such parts then being similar but not identical. Thus the scope of the present invention should not be limited to the structures described by the language of the claims and the equivalents of those structures.

I claim:

1. A fastener comprising two similar parts, each part having a uniform cross section along an axis and including a base portion including means for securing said fastener part to other objects, and major and minor projecting portions projecting in spaced relationship from said base portion, said major projecting portion projecting a greater distance from said base than said minor portion, having a ridge along its distal end parallel to said axis, having a recess along the side of said major portion opposite said minor projecting portion parallel to said axis and defining the side of said ridge adjacent said base portion, and having a plurality of corrugations along the side surface of said major projecting portion adjacent said minor projecting portion and parallel to said axis, said minor projecting portion having a lip along its side adjacent said major projecting portion and parallel to said axis, said major and minor projecting portions of said parts being shaped and spaced from each other to define slots therebetween adapted so that the slot on each part can simultaneously receive the ridge on the other major projecting portion from the other of said parts with said corrugations of said major projecting portions in face to face relationship and the lips on each of said parts in the recess of the other, and said ridges, corrugations and lips of said parts having cam surfaces adapted to engage each other to resiliently bend said parts to afford simultaneous entry of said ridges into said slots and said corrugations into face to face relationship to engage said parts when said parts are pressed together in directions at right angles to their axes, and having cam surfaces adapted to engage each other to resiliently bend said parts to afford simultaneous movement of said ridges out of said slots and movement of said corrugations over each other to disengage said parts when said parts are pulled away from each other in said directions at right angles to their axes.

2. A fastener according to claim 1 wherein the shapes of said parts in planes transverse of said axis are identical.

3. A fastener according to claim 1 wherein said cam surfaces are planar and intersect along lines parallel to said axis to define tooth like corrugations.

4. A fastener according to claim 3 wherein said intersecting planar cam surfaces include engagement surfaces facing generally away from said base portion, which engagement surfaces cam against each other to help resiliently bend the parts and help afford entry of the ridges into the slots when the parts are engaged; and holding surfaces facing generally toward said base portions of said parts that cam against each other to help resiliently bend said parts and afford removal of said ridges from said slots when said parts are separated; with the angles at which said engagement and holding surfaces are disposed with respect to the directions in which the parts are moved into and out of engagement being selected to help provide a larger disengagement force than engagement force for said fastener parts.

5. An elongate member from which parts of fasteners adapted to engage each other may be formed, said elongate member having an axis and a uniform cross section along said axis, the elongate member including a base portion including means for securing fastener parts made from the elongate member to other objects, and major and minor projecting portions projecting in spaced relationship from said base portion, said major projecting portion projecting a greater distance from said base than said minor portion, having a ridge along its distal end parallel to said axis, having a recess along the side of said major portion opposite said minor projecting portion parallel to said axis and defining the side of said ridge adjacent said base portion, and having a plurality of corrugations along the side surface of said major projecting portion adjacent said minor projecting portion and parallel to said axis, said minor projecting portion having a lip along its side adjacent said major projecting portion and parallel to said axis, said portions defining a slot between said major and minor projecting portions adapted, when said elongate member is separated into two parts, so that the slot on each part will simultaneously receive the ridge on the major projecting portion of the other part with said corrugations of said major projecting portions in face to face relationship and the lips on each part in the recess on the other part, and said ridge, lip and corrugations having cam surfaces adapted to engage each other on such parts to resiliently bend said parts to afford entry of said ridges into said slots and said corrugations into face to face relationship to releasably engage said parts when said parts are pressed together in directions at a right angle to their axes and having cam surfaces adapted to engage each other on such parts to resiliently bend said parts to afford simultaneous movement of said ridges out of said slots and movement of said corrugations over each other to disengage said parts when said parts are pulled away from each other in said directions at a right angle to their axes.

6. An elongate member according to claim 5 wherein said cam surfaces on said corrugations are planar and intersect along lines parallel to said axis.

7. An elongate member according to claim 6 wherein said intersecting planar cam surfaces include engagement surfaces facing generally away from said base portion, which engagement surfaces cam against each other to help resiliently bend the parts and help afford entry of the ridges into the slots when the parts are engaged; and holding surfaces facing generally toward said base portions of said parts that cam against each other to help resiliently bend said parts and afford removal of said ridges from said slots when said parts are separated; with the angles at which said engagement and holding surfaces are disposed with respect to the directions in which the parts are moved into and out of engagement being selected to help provide a larger disengagement force than engagement force for said fastener parts.

8. A fastener comprising two similar parts, each part having a uniform cross section along an axis and including a base portion including means for securing said fastener part to other objects, and major and minor projecting portions projecting in spaced relationship from said base portion, said major projecting portion projecting a greater distance from said base than said minor portion, having a ridge along its distal end parallel to said axis, having a recess along the side of said major projecting portion opposite said minor projecting portion parallel to said axis and defining the side of said ridge adjacent said base portion, and having a plurality of corrugations along the side surface of said major projecting portion adjacent said minor projecting portion and parallel to said axis, said minor projecting portion having a lip along its side adjacent said major projecting portion and parallel to said axis, said major and minor projecting portions of said parts being shaped and spaced from each other to define slots therebetween adapted so that the slot on each part can simultaneously receive the ridge from the major projecting portion on the other of said parts with said corrugations of said major projecting portions in face to face relationship and the lips on each of said parts in the recess of the other, and said ridges, corrugations and lips of said parts having cam surfaces adapted to engage each other to resiliently bend said parts to afford simultaneous entry of said ridges into said slots and said corrugations into face to face relationship to engage said parts when said parts are pressed together in directions at right angles to their axes and having holding surfaces adapted to engage each other on such parts to hold said parts together when said parts are pulled away from each other in said directions at a right angle to their axes.

9. A fastener according to claim 8 wherein the shapes of said parts in planes transverse of said axis are identical.

10. A fastener according to claim 8 wherein said cam and holding surfaces are planar and intersect along lines parallel to said axis to define tooth like corrugations.

11. A fastener according to claim 10 wherein said intersecting planar cam surfaces face generally away from said base portion, and said holding surfaces face generally toward said base portions of said parts that engage each other.

12. An elongate member from which parts of fasteners adapted to engage each other may be formed, said elongate member having an axis and a uniform cross section along said axis, the elongate member including a base portion including means for securing fastener parts made from the elongate member to other objects, and major and minor projecting portions projecting in spaced relationship from said base portion, said major projecting portion projecting a greater distance from said base than said minor portion, having a ridge along its distal end parallel to said axis, having a recess along the side of said major projecting portion opposite said minor projecting portion parallel to said axis and defining the side of said ridge adjacent said base portion, and having a plurality of corrugations along the side surface of said major projecting portion adjacent said minor projecting portion and parallel to said axis, said minor projecting portion having a lip along its side adjacent said major projecting portion and parallel to said axis, said portions defining a slot between said major and minor projecting portions adapted, when said elongate member is separated into two parts, so that the slot on each part will simultaneously receive the ridge on the major projecting portion on the other part with said corrugations of said major projecting portions in face to face relationship and the lips on each part in the recess on the other part, and said ridge, lip and corrugations having cam surfaces adapted to engage each other on such parts to resiliently bend said parts to afford entry of said ridges into said slots and said corrugations into face to face relationship to releasably engage said parts when said parts are pressed together in directions at a right angle to their axes and having holding surfaces adapted to engage each other on such parts to hold said parts together when said parts are pulled away from each other in said directions at a right angle to their axes.

13. An elongate member according to claim 12 wherein said cam and holding surfaces are planar and intersect along lines parallel to said axis.

14. An elongate member according to claim 13 wherein said planar cam surfaces face generally away from said base portion, and said planar holding surfaces facing generally toward said base portions of said parts.

* * * * *